United States Patent
Yang

(10) Patent No.: US 11,713,385 B2
(45) Date of Patent: Aug. 1, 2023

(54) DURABILITY-ENHANCED THERMOCHROMIC FILM AND METHOD OF MANUFACTURING SAME

(71) Applicant: Ronggui Yang, Boulder, CO (US)

(72) Inventor: Ronggui Yang, Boulder, CO (US)

(*) Notice: Subject to any disclaimer, the term of this patent is extended or adjusted under 35 U.S.C. 154(b) by 280 days.

(21) Appl. No.: 17/028,397

(22) Filed: Sep. 22, 2020

(65) Prior Publication Data

US 2022/0089835 A1 Mar. 24, 2022

(51) Int. Cl.
| | |
|---|---|
| *C08K 3/22* | (2006.01) |
| *C08L 33/12* | (2006.01) |
| *C08J 3/24* | (2006.01) |
| *C08J 3/28* | (2006.01) |
| *C08J 7/04* | (2020.01) |
| *B82Y 40/00* | (2011.01) |
| *B82Y 30/00* | (2011.01) |

(52) U.S. Cl.
CPC .................... *C08K 3/22* (2013.01); *C08J 3/24* (2013.01); *C08J 3/28* (2013.01); *C08J 7/0427* (2020.01); *C08L 33/12* (2013.01); *B82Y 30/00* (2013.01); *B82Y 40/00* (2013.01)

(58) Field of Classification Search
CPC ... C08J 3/24; C09K 9/00; C08L 33/12; C09D 5/26; C09D 133/12
See application file for complete search history.

(56) References Cited

U.S. PATENT DOCUMENTS 3,816,335 A * 6/1974 Evans ................... B29C 61/003
374/162
5,431,697 A * 7/1995 Kamata ................. C08L 101/00
8/493

FOREIGN PATENT DOCUMENTS

| CN | 112646566 A * | 4/2021 | |
|---|---|---|---|
| WO | WO-2018079732 A1 * | 5/2018 | ............. B32B 17/10 |
| WO | WO-2018092502 A1 * | 5/2018 | ............. B82Y 30/00 |

OTHER PUBLICATIONS

Ban (Direct Synthesis of thermochromic VO2 through hydrothermal reaction. Journal of Solid State Chemistry, 212, 2014, pp. 237-241).*
Machine translation of WO-2018092502-A1 (2018, 11 pages).*
Machine translation of WO-2018079732-A1 (2018, 14 pages).*
A. Zhao (Durability-enhanced vanadium dioxide thermochromic film for smart windows. Materials Today Physics, 13, Apr. 8, 2020).*
Machine translation of CN 112646566 (2021, 7 pages).*

* cited by examiner

*Primary Examiner* — Brieann R Johnston
(74) *Attorney, Agent, or Firm* — Greenberg Traurig, LLP; Alexander Kim; Peigen Jiang

(57) ABSTRACT

A process for fabricating a thermochromic film is disclosed which includes the steps of dispersing a predetermined amount of vanadium dioxide ($VO_2$) nanoparticles in a predetermined amount of poly(methyl methacrylate) (PMMA), stirring a mixture thereof for a first predetermined amount of time, generating cross-links to molecule chains of the PMMA in the mixture, and blade coating a predetermined thickness of the cross-linked mixture on a substrate to form the thermochromic film.

24 Claims, 9 Drawing Sheets

DURABILITY-ENHANCED THERMOCHROMIC FILM AND METHOD OF MANUFACTURING SAME

BACKGROUND

The present invention relates generally to window insulations, and, more particularly, to a durability-enhanced thermochromic film for window retrofits.

With solar transmittance higher than 90%, as much as roughly 800 W/m² solar irradiation reaches the indoor environment through windows during daytime (K. Ismail, J. Henriquez, Thermally effective windows with moving phase change material curtains, Applied Thermal Engineering, 21 (2001) 1909-1923; and R. C. Temps, K. Coulson, Solar radiation incident upon slopes of different orientations, Solar Energy, 19 (1977) 179-184). The transmitted solar energy greatly reduces the energy consumption for heating in cold climates. However, excessive solar heating would result in increased cooling loads in hot climates, especially in summer. Smart windows that can dynamically adjust the transmittance of solar irradiation have been proposed as one of the most promising techniques to reduce the energy consumption of buildings (Y. Wang, E. L. Runnerstrom, D. J. Milliron, Switchable materials for smart windows, Annual Review of Chemical and Biomolecular Engineering, 7 (2016) 283-304; and H. N. Kim, S. Yang, Responsive Smart Windows from Nanoparticle-Polymer Composites, Advanced Functional Materials, (2019) 1902597). In a copending application, U.S. Ser. No. 17/028,301, filed by the common applicant and the disclosure of which incorporated by reference in its entirety, an optically-switchable thermally-insulating vanadium dioxide ($VO_2$) aerogel hybrid film (VAH) is disclosed for retrofitting windows. However, pristine $VO_2$ is thermodynamically unstable and can be easily oxidized to $V_2O_5$ when exposed to air for several months, which in turn dramatically reduces the solar modulation ability. A humid environment would also greatly accelerate the oxidation process.

Even though environmentally stable oxides like $SiO_2$, $TiO_2$, and ZnO have been used to increase the durability of $VO_2$ nanoparticles, in practical applications, when VO2 nanoparticles transit periodically from monoclinic (M, a_M=5.75,b_M=4.52 Å,c_M=5.38 Å,β=122.6°) structure to tetragonal rutile (R, a_R=b_R=4.55 Å,c_R=2.86 Å) structure (Y. Cui, Y. Ke, C. Liu, Z. Chen, N. Wang, L. Zhang, Y. Zhou, S. Wang, Y. Gao, Y. Long, Thermochromic $VO_2$ for energy-efficient smart windows, Joule, (2018)), the interface stress between the $VO_2$ cores and oxide protection shells induced by the lattice structure transformation of $VO_2$ nanoparticles may result in the formation of micro cracks at the interface. The accelerated aging tests at a temperature of 60° C. and 90% relative humidity showed that the lifetime of the $SiO_2$ coated $VO_2$ nanoparticles were only about 72 hours due to the appearance of such cracks (Y. Chen, X. Zeng, J. Zhu, R. Li, H. Yao, X. Cao, S. Ji, P. Jin, High performance and enhanced durability of thermochromic films using $VO_2$@ ZnO core-shell nanoparticles, ACS Applied Materials & Interfaces, 9 (2017) 27784-27791). It is also worthwhile to note that although the introduction of a shell layer potentially enhances the durability of $VO_2$ nanoparticles and improves the solar luminous transmittance, it may lower the solar modulation ability of the film. For example, the experimental results by Li et al. showed that the solar modulation ability decreased about 50% when the $VO_2$ nanoparticles were coated by approximately 7 nm thick $TiO_2$ shells (Y. Li, S. Ji, Y. Gao, H. Luo, M. Kanehira, Core-shell $VO_2$@$TiO_2$ nanorods that combine thermochromic and photocatalytic properties for application as energy-saving smart coatings, Scientific Reports, 3 (2013) 1370).

As such, it is desirable to further improve the anti-oxidation ability and increase the lifetime of $VO_2$ nanoparticles in thermochromic films.

SUMMARY

A process for fabricating a thermochromic film is disclosed which includes the steps of dispersing a predetermined amount of vanadium dioxide ($VO_2$) nanoparticles in a predetermined amount of poly(methyl methacrylate) (PMMA), stirring a mixture thereof for a first predetermined amount of time, generating cross-links to molecule chains of the PMMA in the mixture, and blade coating a predetermined thickness of the cross-linked mixture on a substrate to form the thermochromic film. The area and thickness of the fabricated film are 600 mm×300 mm (length×width) and approximately 4 μm, respectively. It is shown that the PMMA-$VO_2$ film has a luminous transmittance of about 50%, solar modulation ability of about 17.1%, and haze of about 11%. The solar modulation ability of the PMMA-$VO_2$ film is higher than that of most previous studies which are usually smaller than 10%. The lifetime of the $VO_2$ nanoparticles is greatly improved by the cross-linked polymer matrix with high molecular weight. The durability tests were performed in the accelerated aging chamber whose environmental temperature is 60° C., and humidity is >95%. It was shown that the lifetime of the $VO_2$ nanoparticles embedded in the cross-linked PMMA matrix with molecular weight of approximately 950,000 is about 900 hours, which is much longer than that (about 200 hours) of the $VO_2$ in the non-cross-linked PMMA matrix with low molecular weight (about 15,000). The lifetime of the $VO_2$ nanoparticles in the highly entangled and cross-linked polymer matrix is close to or longer than the lifetime of thermochromic films made of $VO_2$ protected by environmental stable materials (e.g., aluminum oxide and SiNx), indicating that cross-linked the polymer chains with high molecular weight could improve the durability of $VO_2$ remarkably. It was shown that there is no decay of the solar modulation ability after about 3000 cycles of fatigue test. The PMMA-$VO_2$ film could greatly reduce the cooling demands in hot climates and improve the thermal comfort in cold climates.

Figure 1A:
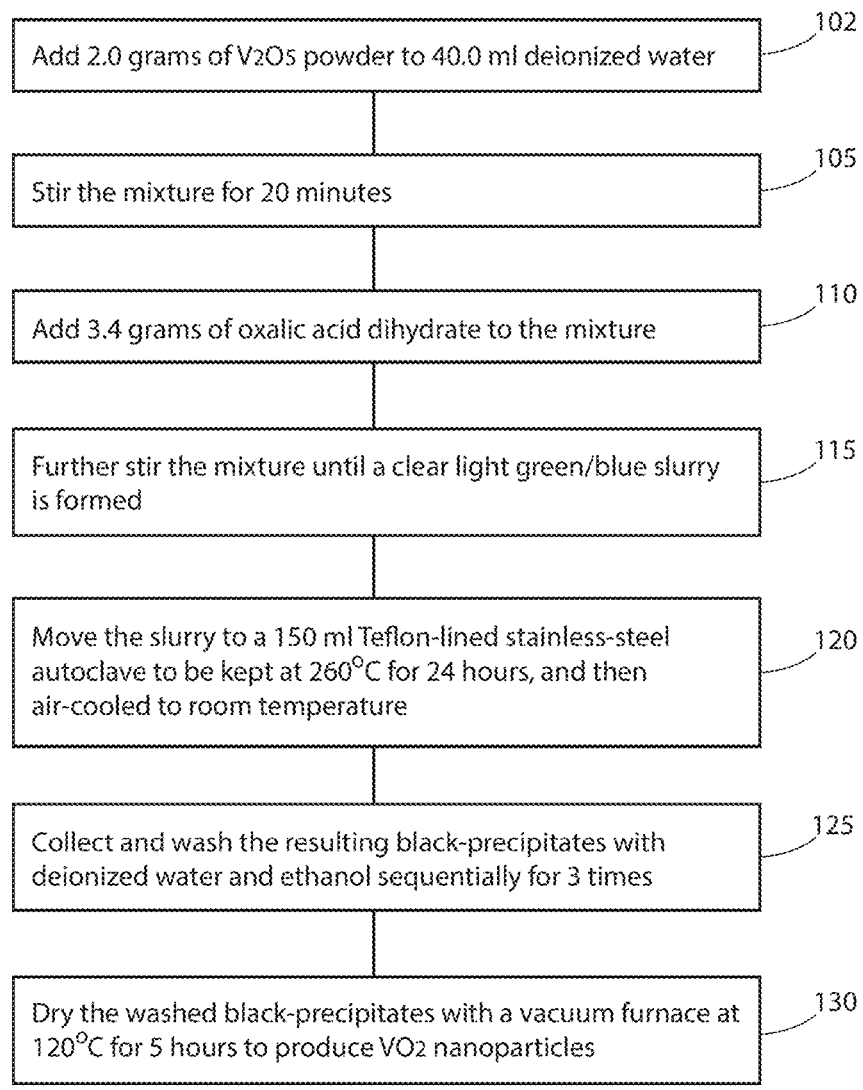
FIGS. 1A and 1B are flowcharts illustrating a process of producing a durability-enhanced thermochromic film according to an embodiment of the present disclosure.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a durability-enhanced thermochromic film with core-shell nanoparticle structures. A preferred embodiment of the present invention will be described hereinafter with reference to the attached drawings.

Figure 1B:
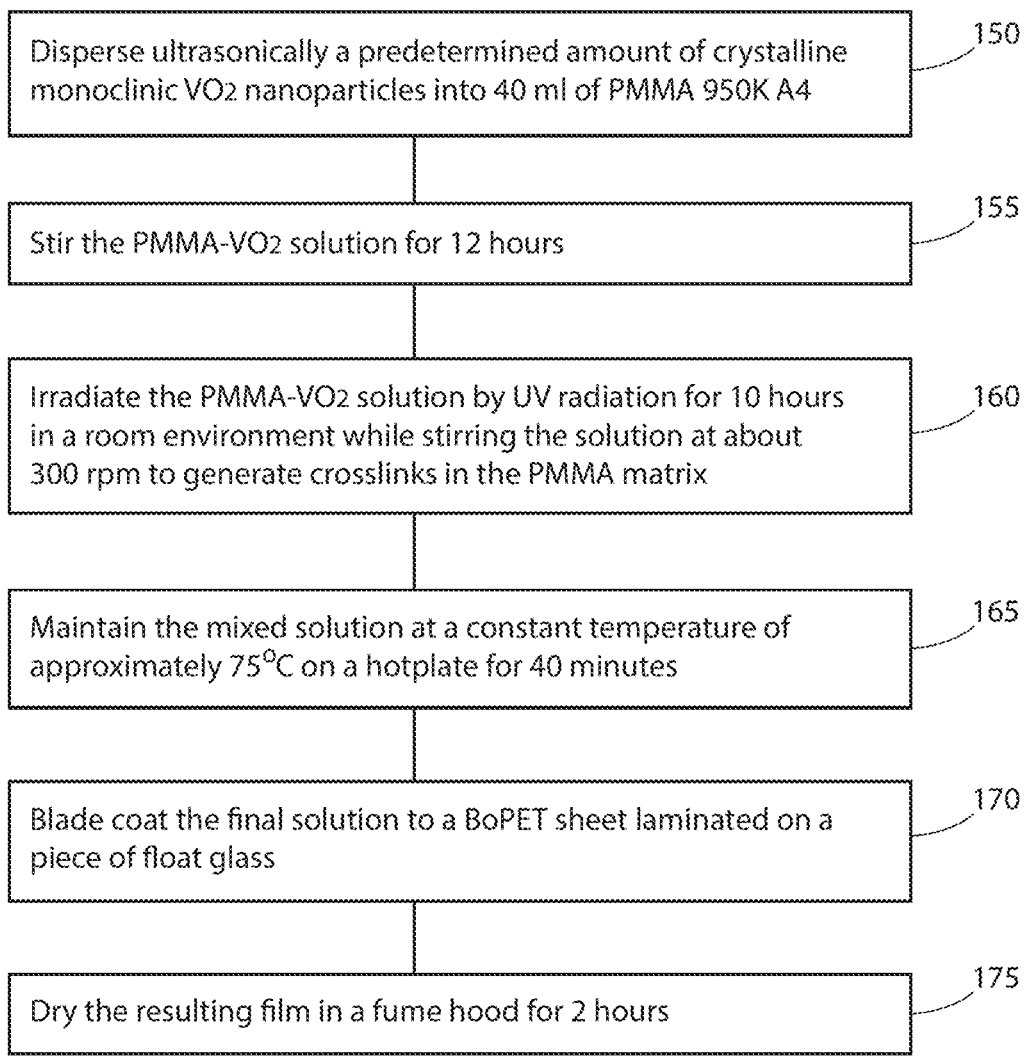

FIGS. 1A and 1B are flowcharts illustrating a process of producing a durability-enhanced thermochromic film according to an embodiment of the present disclosure. Referring to FIG. 1A, an exemplary process of synthesizing crystalline VO$_2$ nanoparticles begins with step 102 in which 2.0 grams of V$_2$O$_5$ powder is added to 40.0 ml deionized water. In step 105, the V$_2$O$_5$/deionized water mixture is stirred for 20 minutes. In step 110, 3.4 grams of oxalic acid dihydrate is added to the mixture. In step 115, the mixture is further stirred until a clear light green or blue slurry is formed. In step 120, the slurry is moved to a 150 ml Teflon-lined stainless-steel autoclave to be kept at 260° C. for 24 hours, and then air-cooled to room temperature. In step 125, the resulting black-precipitates are collected and washed with deionized water and ethanol sequentially for 3 times. In step 130, the washed black-precipitates are dried with a vacuum furnace at 120° C. for 5.0 hours. Then crystalline monoclinic VO$_2$ nanoparticles are obtained for being embedded in a polymer matrix material. In an embodiment, poly(methyl methacrylate) (PMMA) A4 (molecular weight about 950K from MicroChem Corp) resists in anisole is used.

PMMA is a non-toxic, inexpensive thermoplastic with high optical transparency, high mechanical strength and durability, excellent thermal stability, and weather resistance. PMMA with different molecular weights (chain length and entanglement) could be obtained and processed easily. Moreover, the influence of the near-UV from solar radiation on the PMMA is minor since PMMA is only sensitive to high energy radiation such as the electron beam, x-rays, and UV radiation with wavelengths shorter than 300 nm. Thus, PMMA is exemplarily adopted as a polymer matrix for embedding the VO$_2$ nanoparticles.

Referring to FIG. 1B, a process of forming a PMMA-VO$_2$ film begins in step 150, in which a predetermined amount of crystalline monoclinic VO$_2$ nanoparticles are ultrasonically dispersed into 40 ml of PMMA A4. In step 155, the PMMA-VO$_2$ solution is stirred for approximately 12 hours. Generally, the molecule chains of PMMA can be interlinked using several methods, including free radical polymerization, condensation reactions, small molecule crosslinking and radiation. In step 160, the PMMA-VO$_2$ solution is exemplarily irradiated by UV radiation (220~380 nm, ADJ Products) for about 10 hours in a room environment while being stirred at about 300 rpm to generate crosslinks in the PMMA matrix. The crosslinking degree of the PMMA matrix can be controlled by dose and time of the UV irradiation. Since the PMMA matrix with a higher crosslinking degree usually has a higher endothermic peak, the radiation dose needs to be smaller than 2.0 J/cm$^2$ to prevent the brittleness of PMMA film after crosslinking. In step 165, the mixed solution is maintained at a constant temperature of approximately 75° C. on a hotplate for 40 minutes. In step 170, the final solution is then blade coated onto a transparent and chemically stable biaxially-oriented polyethylene terephthalate (BoPET) sheet laminated on a piece of float glass. In an embodiment, the BoPET sheet is approximately 50 μm thick. A final thickness of the dried PMMA-VO$_2$ film is determined by the concentration of PMMA, the moving speed of the blade and the gap between the blade tip and the BoPET substrate. In an embodiment, the PMMA-VO$_2$ film is formed using blade coating at a speed of 15 mm/sec. In step 175, the resulting wet film is dried in a fume hood for 2 hours. Then a PMMA-VO$_2$ film coated on a 50 μm thick BoPET film that can be applied onto windowpane is obtained.

Figure 1C:
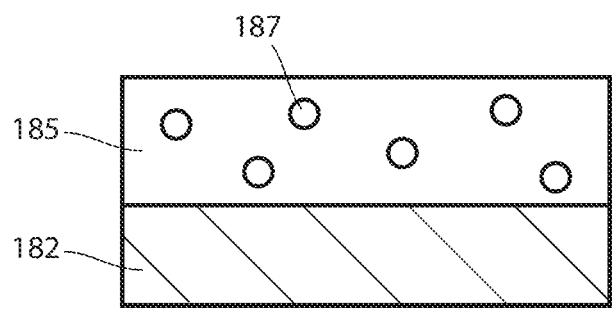
FIG. 1C is a cross-sectional view of the PMMA-$VO_2$-on-BoPET film formed by the process depicted in FIGS. 1A and 1B.

FIG. 1C is a cross-sectional view of the PMMA-VO$_2$-on-BoPET film formed by the process depicted in FIGS. 1A and 1B. The BoPET film 182 serves as a substrate for the blade coated PMMA-VO$_2$ film 185 with VO$_2$ nanoparticles randomly dispersed therein. Although PMMA is exemplarily used as the matrix material for reducing diffusion capacity of gas molecules therein, a skilled in the art may realize that other cross-linked polymer matrix materials can also be used to alleviate the natural oxidation of the embedded VO$_2$ nanoparticles.

For measuring the PMMA-VO$_2$ film, the commercial Netzsch differential scanning calorimetry (DSC 204 F1 Phoenix) can be used to determine the phase transition properties of the synthesized VO$_2$ powder over the temperature range from 0 to 100° C., and the heat absorption properties of the PMMAs from 0 to 550° C., respectively. The heating/cooling rate was set at 10° C./min. The crystalline phase of the VO$_2$ powder was identified using X-ray diffraction (XRD, MiniFlex600, Rigaku, Japan) with Cu Kα radiation ($\lambda$=1.5418) at a voltage 40 kV and a current of 40 mA. Transmission electron microscope (TEM, JEM-2010) was used to characterize the morphology and microstructure of the nanoparticles. Optical performance, including spectral transmittance and haze of the films, can be measured using a UV-Vis-Near-IR spectrophotometer (Shimadzu UV-3101) together with a temperature control unit including black anodized aluminum 6061 plate, and a variac (2 A, 120 V). A helium-neon (HeNe) laser (SIEMENS), and a programmable stage temperature controller (LINKAM TMS 94) together with a heating/freezing microscope stage (LINKAM MDS600) with a microscope objective lens (NIKON, Plan Fluor ELWD 20×/0.45) was assembled to measure the reflectance spectrum of the film with a 200 nm silver coating in 633 nm at 25° C. and 90° C. with ramping rate 10° C./min. A TPS (TENNEY) environmental chamber was used to create a steady-state temperature and humidity (60° C., relative humidity around 95%) for the durability testing of the PMMA-VO$_2$ films.

Figure 2A:
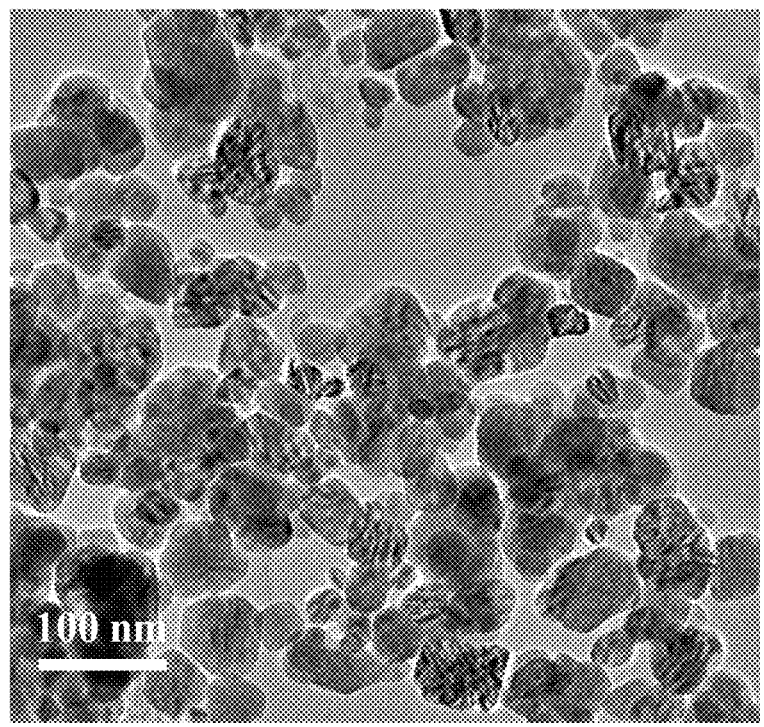
FIGS. 2A-2D illustrate characterization of the synthesized $VO_2$ nanoparticles according to the processes shown in FIGS. 1A and 1B.

FIGS. 2A-2D illustrate characterization of the synthesized VO$_2$ nanoparticles according to the processes shown in FIGS. 1A and 1B. Specifically, FIG. 2A shows the morphology of VO$_2$ nanoparticles from transmission electron microscopy (TEM). It is seen that most of the nanoparticles have an approximately spherical shape, and the diameter of the VO$_2$ nanoparticles mainly lies in the range of 50~80 nm.

Figure 2B:
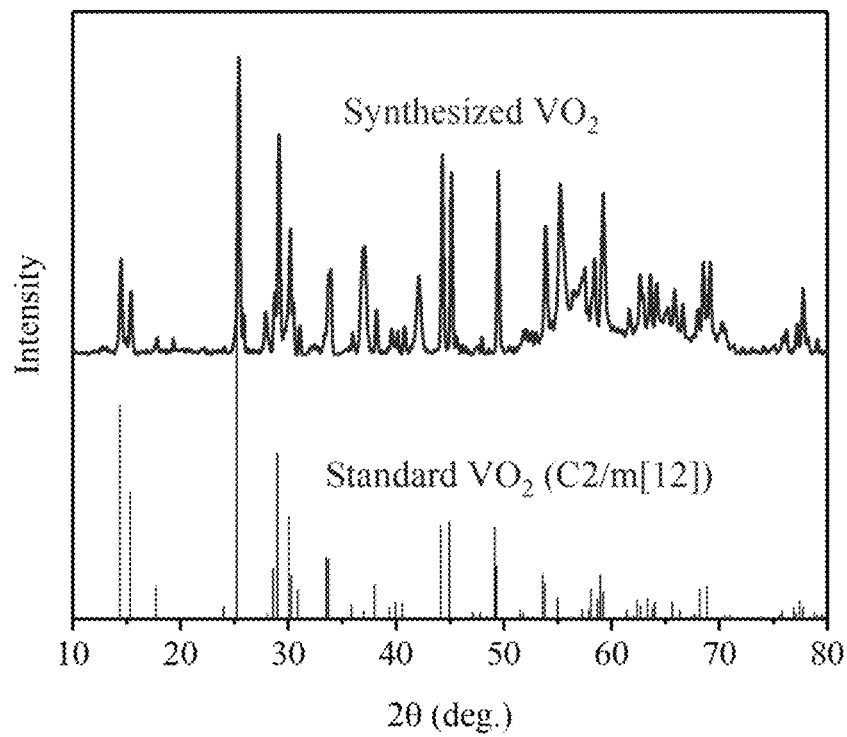

FIG. 2B presents an X-Ray Diffraction (XRD) measurement of the $VO_2$ nanoparticles, where the diffraction peaks indicate that the $VO_2$ nanoparticles are in the monoclinic phase (M2, C2/m). The phase transition temperature of the $VO_2$ nanoparticles was determined by differential scanning calorimetry (DSC) measurements using a heating/cooling rate of 10° C./min in the temperature range from 0 to 110° C. Since the insulator-to-metal transformation of $VO_2$ is a first-order phase transition, the discontinuous variation of entropy results in the release or absorption of latent heat.

Figure 2C:
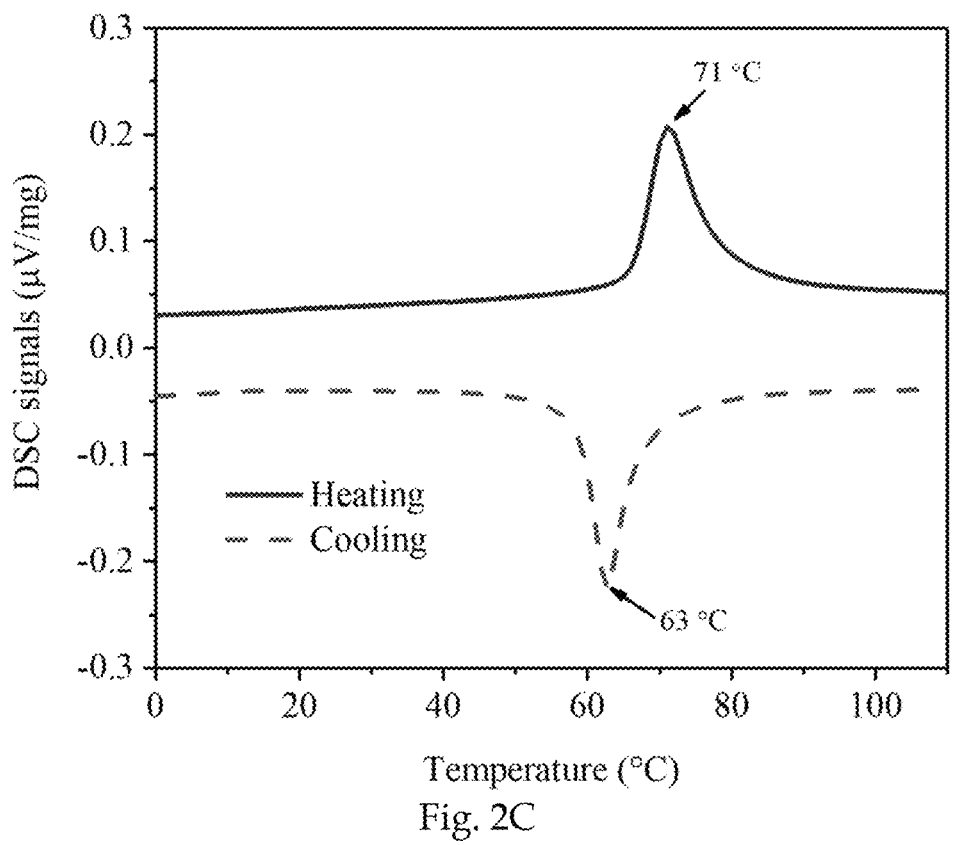

As shown in FIG. 2C, when $VO_2$ transits from the monoclinic (M) insulator phase to the rutile (R) phase during the heating cycle, an endothermic (positive) peak with peak temperature at about 71° C. is observed. A corresponding exothermic (negative) peak, representing metal-to-insulator transition, occurs in the cooling cycle, where the peak temperature is about 63° C. Since the crosslinking process could generate new chemical bonding between neighboring chains, the cross-linked PMMA polymers are expected to have a higher endothermic peak and a larger maximum decomposition temperature.

Figure 2D:
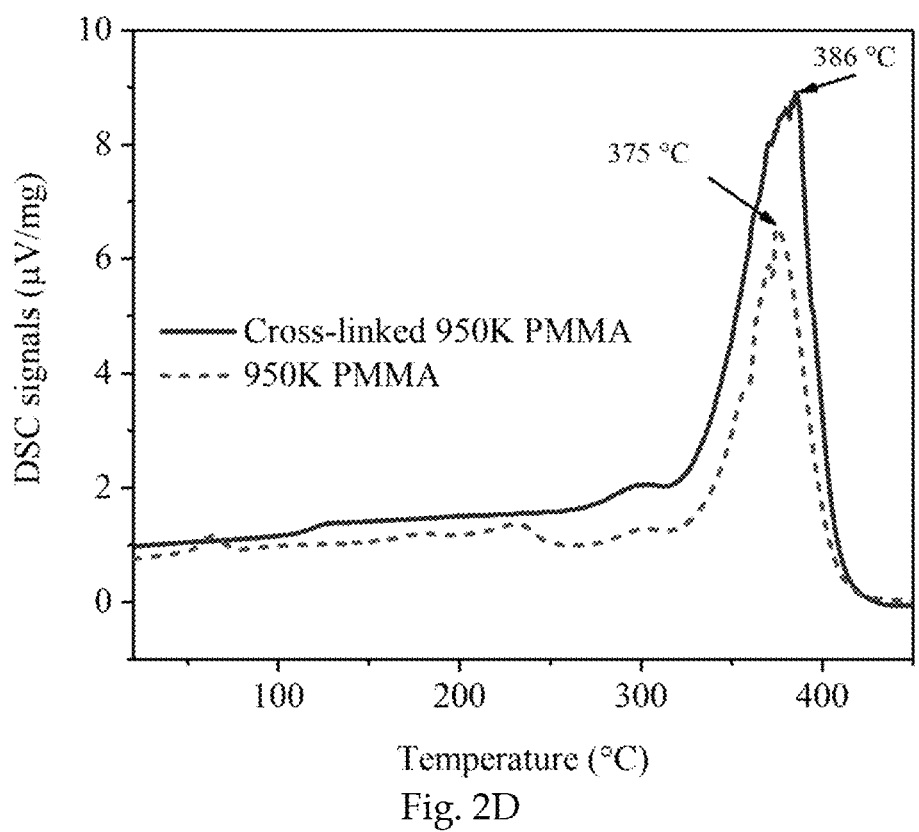

FIG. 2D compares the DSC thermographs of cross-linked PMMA and non-cross-linked PMMA with molecular weight approximately 950,000. Comparing to the non-UV exposed 950,000 PMMA, the 950,000 PMMA under UV exposure has a higher endothermic peak (from about 6.0 μV/mg to about 9.5 μV/mg) and a larger maximum decomposition temperature (from 375° C. to 386° C.), indicating the crosslinks were generated.

To evaluate the thermochromic performance of the PMMA-$VO_2$ film, the total transmittance and haze, were both measured using a commercial UV-Vis-Near-IR spectrophotometer (Shimadzu UV-3101). The total transmittance ($\tau_{\lambda,tot}$) were measured by placing the PMMA-$VO_2$ film and a diffuse reflector at the inlet and outlet of the integrating sphere, respectively.

Figure 3A:
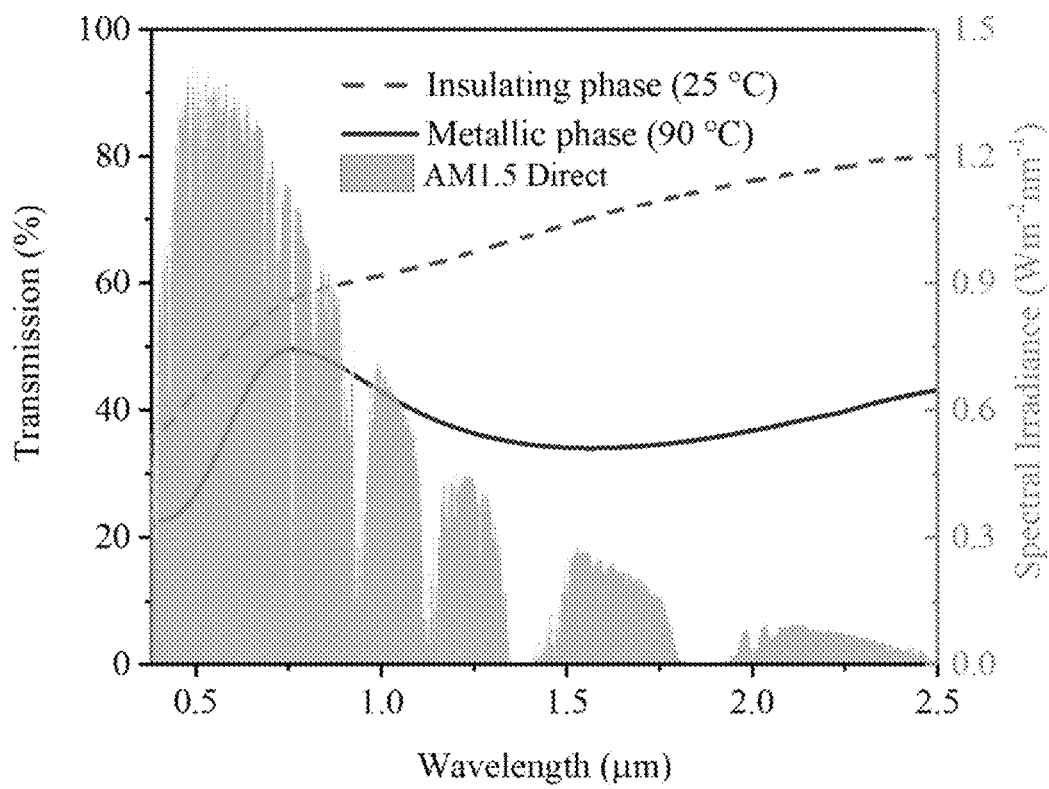
FIGS. 3A and 3B illustrate optical performance of the PMMA-$VO_2$ thin film fabricated according to embodiments of the present disclosure for energy-efficient smart windows.
Figure 3B:
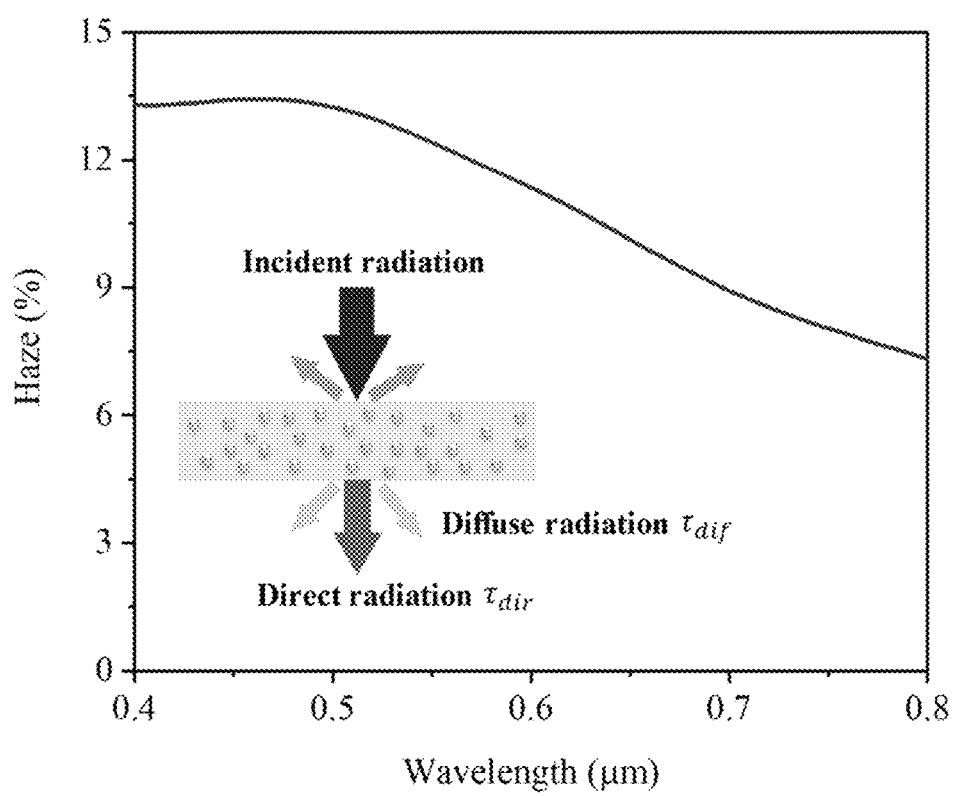

FIGS. 3A and 3B illustrate optical performance of the PMMA-$VO_2$ thin film fabricated according to embodiments of the present disclosure for energy-efficient smart windows. Specifically, FIG. 3A illustrates measured total spectral transmittances of the PMMA-$VO_2$ film at low temperature (approximately 25° C.) and high temperature (approximately 90° C.). Since the metallic phase $VO_2$ blocks the near-infrared (NIR) solar radiation, it was found that the transmittance of the PMMA-$VO_2$ in the range of 0.8~2.5 μm was much smaller when the temperature of the PMMA-$VO_2$ film was set at approximately 90° C. The mean luminous (380-780 nm) transmittance $\tau_{lum}$ and mean solar (280-2500 nm) transmittance $\tau_{sol}$ were then calculated as, $$\tau_{lum} = \frac{\int_{380\,nm}^{780\,nm} I_{lum,\lambda} \tau_{\lambda,tot} d\lambda}{\int_{380\,nm}^{780\,nm} I_{lum,\lambda} d\lambda} \quad (1)$$

$$\tau_{sol} = \frac{\int_{280\,nm}^{2500\,nm} I_{sol,\lambda} \tau_{\lambda,tot} d\lambda}{\int_{280\,nm}^{2500\,nm} I_{sol,\lambda} d\lambda} \quad (2)$$

where $I_{lum,\lambda}$ is the standard luminous efficiency function for vision, $I_\lambda$ is the solar radiation intensity of air mass 1.5 (AM1.5) corresponding to the sun standing 37° above the horizon, and $\tau_\lambda$ is the transmittance of radiation at wavelength λ shown in FIG. 3A. The solar modulation ability $\Delta\tau_{sol}$ is defined by the difference of solar transmittance before and after the phase transition, i.e., $$\Delta\tau_{sol} = \tau_{sol}(T<T_c) - \tau_{sol}(T>T_c) \quad (3)$$

According to Eqs. (1-2), the luminous transmittance at low temperature and solar modulation ability are calculated to be approximately 50% and approximately 17.1%, respectively. The sample PMMA-$VO_2$ film made according to the steps shown in FIG. 1, have been checked. The uniformity of the coating by measuring the transmittance of the film at several different locations. The difference of the solar transmittances among different points was found to be smaller than 1%.

Haze is used to characterize the percentage of the transmitted light whose propagation direction deviates a specific angle from the direction of the incident beam. According to the ASTM D1003-13 (ASTM D1003-13-Standard test method for haze and luminous transmittance of transparent, ASTM International West Conshohocken, 2013), haze is defined as, $$H_\lambda = \frac{\tau_{dif,\lambda}}{\tau_{tot,\lambda}} = \frac{\tau_{dif,\lambda}}{\tau_{dif,\lambda} + \tau_{dir,\lambda}} \quad (4)$$

where $\tau_{dif,\lambda}$ refers to the light scattered more than 2.5° off from the incident light, and $\tau_{dir,\lambda}$ is the transmitted light within the angle of 2.5°. The diffuse transmittance can be measured by replacing the diffuse reflector at the outlet of the integrating sphere with a light trap to prevent the direct transmittance from influencing the measurement signal. Since the $VO_2$ nanoparticle size (50 to 80 nm) is much smaller than the wavelength of the visible light (0.4 to 0.8 μm), the scattering of the light passing through the PMMA-$VO_2$ films can be described by Rayleigh scattering, where the scattering density $$I_{sca} \propto \frac{d^6}{\lambda^4},$$

where λ is the incident wavelength and d is the diameter of the nanoparticle.

FIG. 3B demonstrates that the haze value decreases as a wavelength of an incident radiation increases. The averaged haze value in the visible range is calculated as, $$H = \frac{\int_{380\,nm}^{780\,nm} H_\lambda I_{lum,\lambda} d\lambda}{\int_{380\,nm}^{780\,nm} I_{lum,\lambda} d\lambda} \quad (5)$$

where $H_\lambda$ is the measured haze value at wavelength λ. According to Eq. (5), the averaged haze in the luminous range is approximately 11%, as shown in FIG. 3B. Note that the haze of the developed film could be lowered by further reducing the size of the $VO_2$ nanoparticles based on the Rayleigh scattering. In sum, the PMMA-$VO_2$ thin film fabricated according to the steps shown in FIGS. 1A and 1B has high luminous transmittance (approximately 50%), large solar modulation ability (approximately 17.1%), and relatively low haze visibly (approximately 11%).

Oxygen and moisture in the ambient air could diffuse into the polymer matrix and oxidize the phase-switchable $VO_2$ to non-switchable $V_2O_5$, resulting in the loss of solar modulation ability. It is thus desirable to reduce the diffusion capacity of gas molecules in the polymer matrix. Thermal stability, surface hardness, and chemical resistance of the polymer matrix can be improved significantly using entangled and cross-linked molecular chains, which is also directly related to a smaller gas diffusion coefficient.

In practice, the natural oxidation of $VO_2$ is a long process, and the obvious variation of the thermochromic property in the ambient conditions may only be observed after a few months. Thus, accelerated environmental tests were performed to evaluate the durability of $VO_2$ nanoparticles. The tests were conducted at a temperature of 60° C., and the relative humidity at approximately 95%. Systematic measurements of spectral transmittance at both low temperature (25° C., insulating phase) and high temperature (90° C., metallic phase) were recorded as a function of time to determine the variation of the thermochromic performance. Each measurement was then repeated at least three times to ensure the testing reliability. To investigate the influence of crosslinking and entanglement on the durability of the PMMA-$VO_2$ film, the cross-linked and non-crossed-linked PMMA-$VO_2$ film with two different molecular weights were measured.

FIGS. 4A-4D demonstrate the durability performance of the PMMA-$VO_2$ thin films fabricated according to embodiments of the present disclosure under the aforementioned accelerated environmental test conditions. Specifically, FIG. 4A demonstrates that the cross-linked PMMA film with molecular weight approximately 950,000 exhibits no noticeable change in optical transmittance after about 200 hours. The thermochromic properties of cross-linked PMMA-$VO_2$ film with molecular weight approximately 950,000 begin to deteriorate after about 450 hours exposure while still maintaining more than 60% of its solar modulation ability (approximately 10%). After about 900 hours, the solar modulation ability decreased from about 17.1% to about 4.0%, indicating that a large part of the $VO_2$ nanoparticles was oxidized. For comparison, the durability performances of the non-cross-linked PMMA with molecular weights of approximately 15,000 (FIG. 4B) and approximately 950,000 (FIG. 4C) were also tested under the same accelerated testing conditions (60° C., humidity >95%).

Figure 4A:
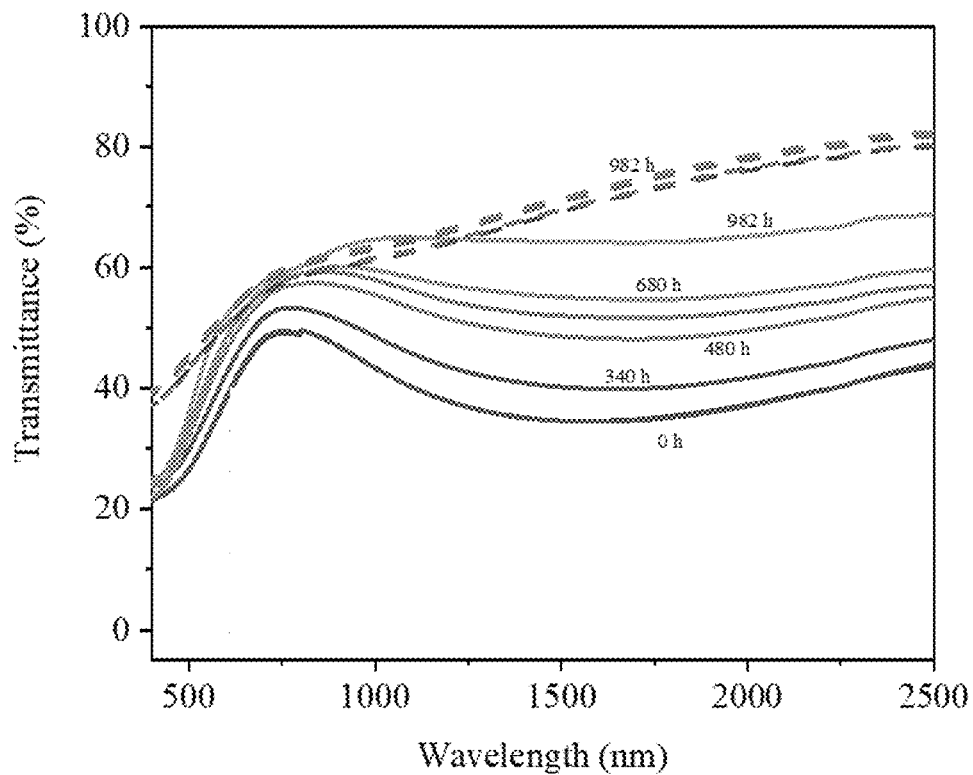
FIGS. 4A-4D demonstrate the durability performance of the PMMA-$VO_2$ thin films fabricated according to embodiments of the present disclosure.
Figure 4B:
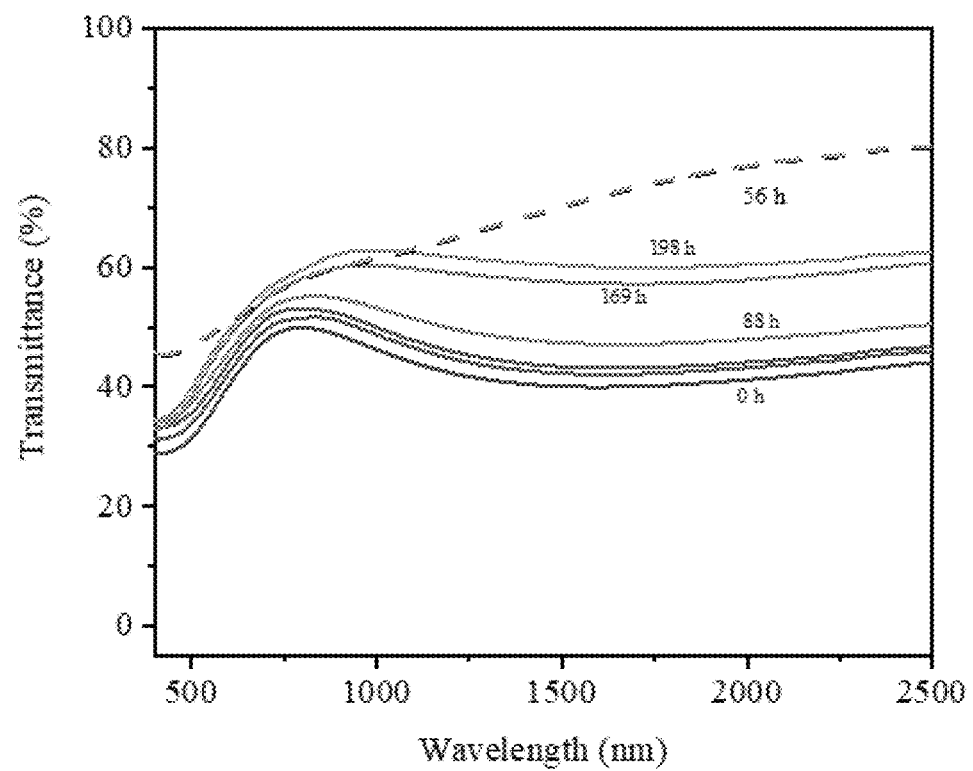
Figure 4C:
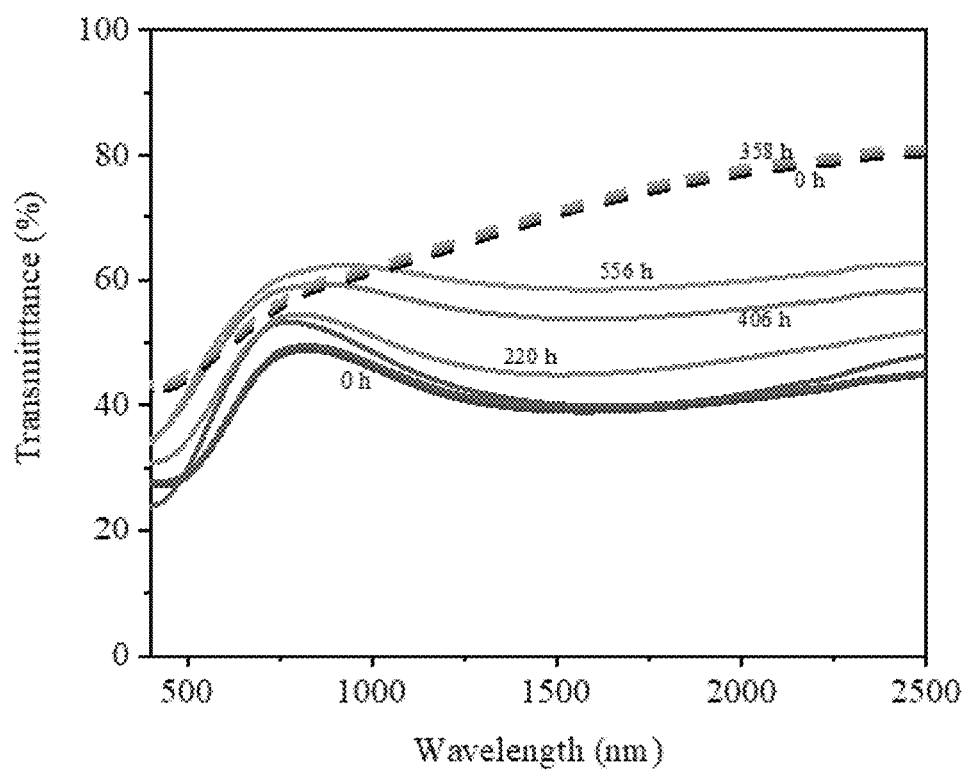
Figure 4D:
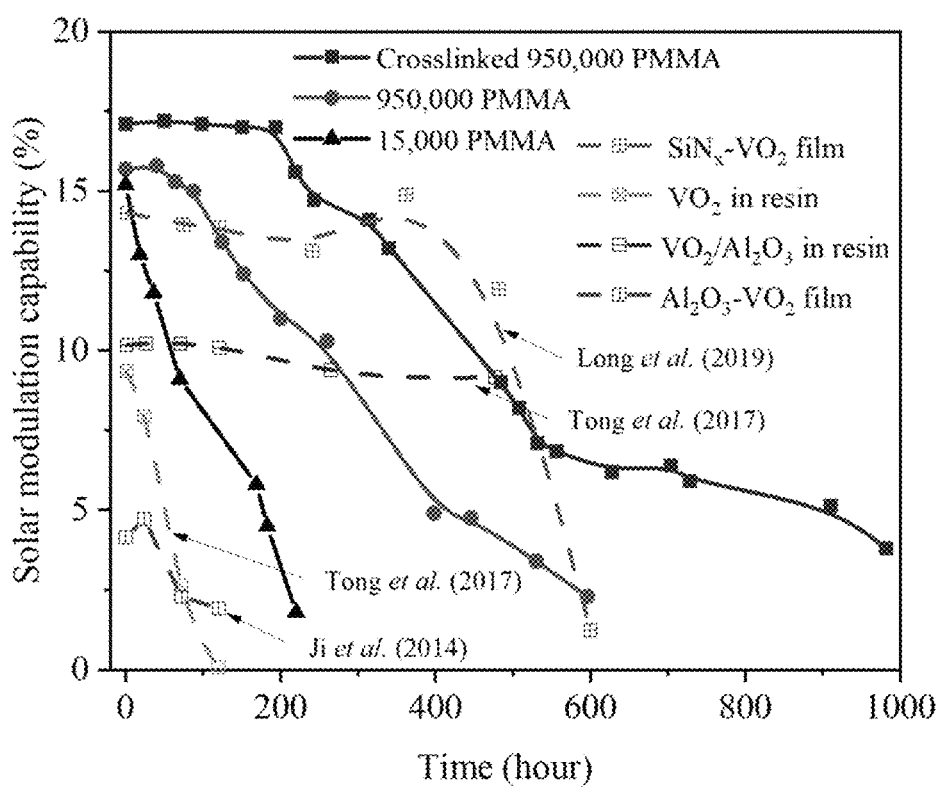

FIG. 4D illustrates the variation of solar modulation abilities of the above three PMMA-$VO_2$ films as a function of time. It is seen that the decreasing rate of the non-cross-linked film with molecular weight of approximately 15,000 is much faster than that of the non-cross-linked PMMA with molecular weight of approximately 950,000, which is close to decreasing rate of the uncoated $VO_2$ in the matrix of resin. The thermochromic performance of the $VO_2$ in the non-cross-linked PMMA with molecular weights of approximately 15,000 disappears after about 200 hours. Furthermore, it is found that the lifetime of the cross-linked 950,000 PMMA was approximately 350 hours longer than that of non-cross-linked 950,000 PMMA at about 600 hours. This indicates that the entangled and crosslinked polymer matrix can substantially improve the lifetime of $VO_2$ nanoparticles in the PMMA film.

Referring again to FIG. 4D, the lifetime of the PMMA-$VO_2$ film developed according to the embodiment of the present disclosure is better than the previously reported values for $VO_2$ nanoparticles coated by $SiO_2$ (about 72 hours), $Al(OH)_3$ (about 120 hours) (Y. Chen, X. Zeng, J. Zhu, R. Li, H. Yao, X. Cao, S. Ji, P. Jin, High performance and enhanced durability of thermochromic films using $VO_2$@ZnO core-shell nanoparticles, ACS Applied Materials & Interfaces, 9 (2017) 27784-27791), and $VO_2$ thin film protected by $Al_2O_3$ (about 100 hours) (Y.-X. Ji, S.-Y. Li, G. A. Niklasson, C. G. Granqvist, Durability of thermochromic $VO_2$ thin films under heating and humidity: effect of Al oxide top coatings, Thin Solid Films, 562 (2014) 568-573), and is comparable to the performances of $VO_2$ nanoparticles coated by $Al_2O_3$ (>480 hours) (K. Tong, R. Li, J. Zhu, H. Yao, H. Zhou, X. Zeng, S. Ji, P. Jin, Preparation of $VO_2$/Al—O core-shell structure with enhanced weathering resistance for smart window, Ceramics International, 43 (2017) 4055-4061) and $VO_2$ thin film protected by SiNx (about 600 hours) (S. Long, X. Cao, N. Li, Y. Xin, G. Sun, T. Chang, S. Bao, P. Jin, Application-oriented $VO_2$ thermochromic coatings with composite structures: optimized optical performance and robust fatigue properties, Solar Energy Materials and Solar Cells, 189 (2019) 138-148). The PMMA-$VO_2$ film fabricated according to the embodiment of present disclosure has demonstrated an alternative pathway to effectively improve the lifetime of the $VO_2$ nanoparticles, avoiding the emergence of cracks induced by the periodic insulator-to-metal phase change found in the core-shell structures.

Fatigue tests are used to determine the numbers of cycles (fatigue life) that a material or structure can withstand under cyclic loadings. The emergence of cracks in $VO_2$-based films or complete fractures may occur due to the lattice transformation of $VO_2$ during many cycles of phase transitions from the insulating to the metallic state. Therefore, the fatigue test is performed to study the stability of the PMMA-$VO_2$ thermochromic film developed according to embodiments of the present disclosure.

Figure 5A:
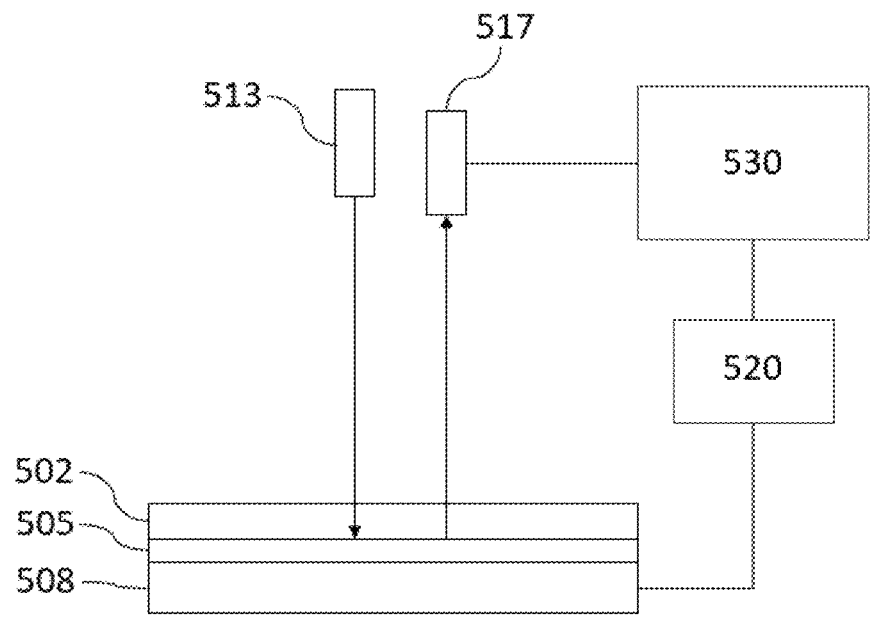
FIG. 5A illustrates a setup for fatigue measurements

FIG. 5A illustrates a setup of fatigue test for the PMMA-$VO_2$ film fabricated according to embodiments of the present disclosure. A PMMA-$VO_2$ sample 502 is coated on an approximately 100 nm thick bottom silver layer 505. The resulting film is then placed on a programmable stage 508 which is temperature controlled a computerized controller 520 such as a LINKAM MDS600. The programmable stage 508's temperature ramping rate is set at 15° C./min and an extra 45 seconds delay was assigned to stabilize the temperature of the film at both 25° C. and 90° C. Meanwhile, the film was constantly exposed to a 633 nm focused laser beam from a helium-neon (HeNe) laser 513. The intensity of the transmitted light (μW) was then recorded by one or more detectors 517 and a computer 530 at both low temperature (25° C., insulating phase) and high temperature (90° C., metallic phase) to complete a cycle.

Figure 5B:
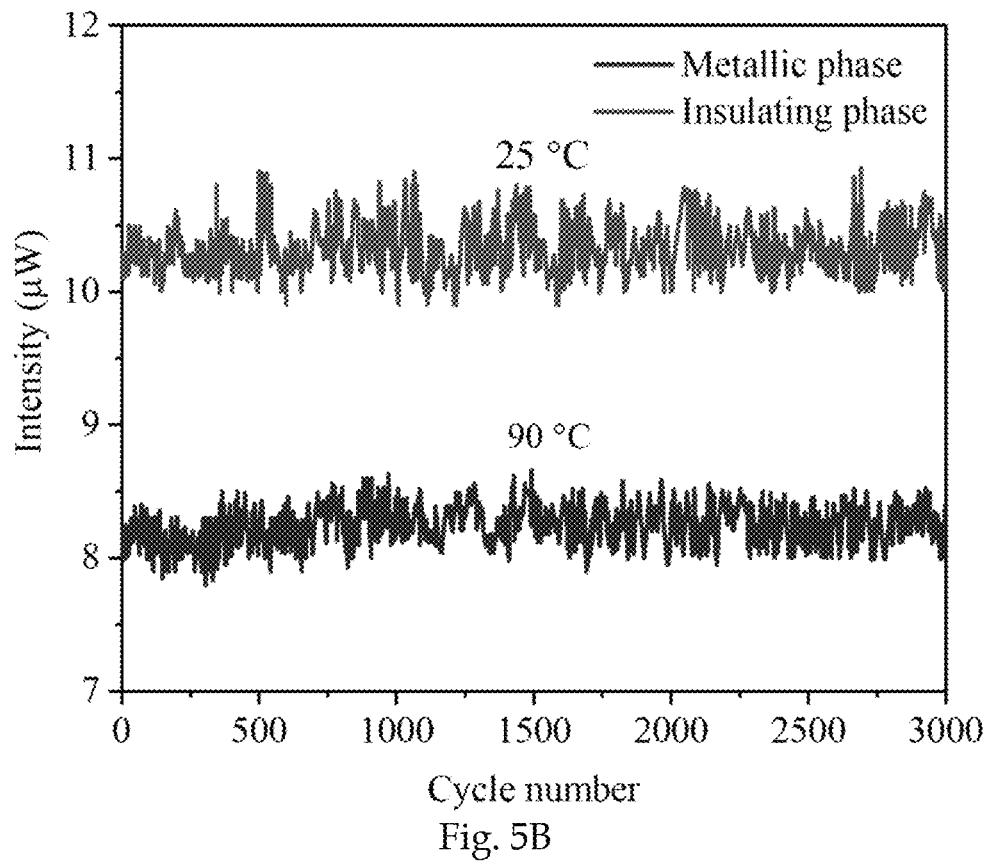
FIG. 5B illustrates variation of the transmittance of the PMMA-$VO_2$ film fabricated according to embodiments of the present disclosure as a function of a cycle number.

FIG. 5B illustrates a relationship between the number of cycles and the intensity of the transmitted light. As shown in FIG. 5B, there is no noticeable change in transmitted laser intensity in both the metallic and insulator phase after 3000 continuous cycles, indicating that the solar modulation ability of the cross-linked PMMA-$VO_2$ remained constant. To ensure the reliability of the test, the measurements were repeated at another two sample locations during each cycle and the results in FIG. 5B are an arithmetic average of the three tested points. Note that since incident light traveled across the film twice, the difference between the metallic phase (25° C.) and the insulator phase (90° C.) in FIG. 5B is approximately twice larger than that of FIG. 3A.

Figure 6A:
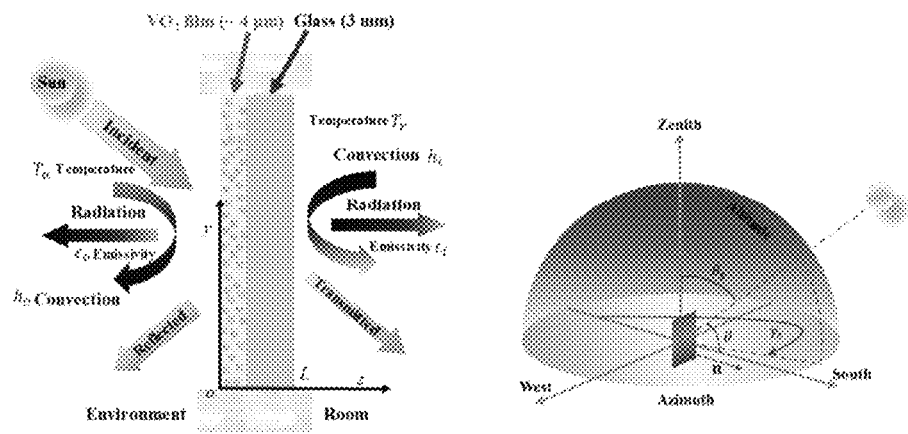
FIGS. 6A-6C demonstrate thermal comfort and energy saving of the PMMA-VO$_2$ film of the present disclosure applied to windowpanes in selected cities.
Figure 6B:
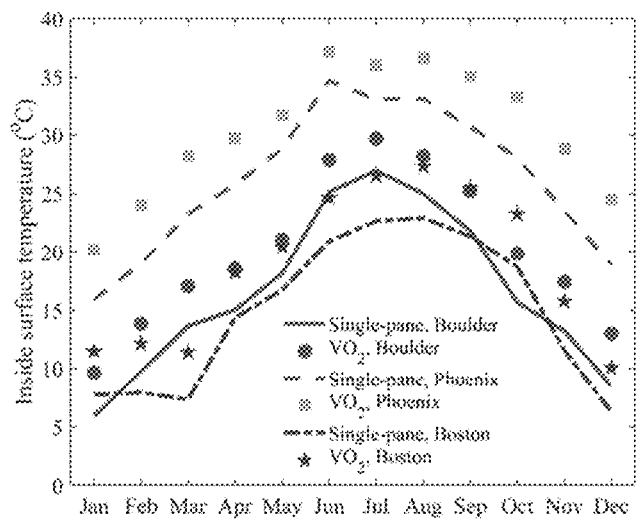
Figure 6C:
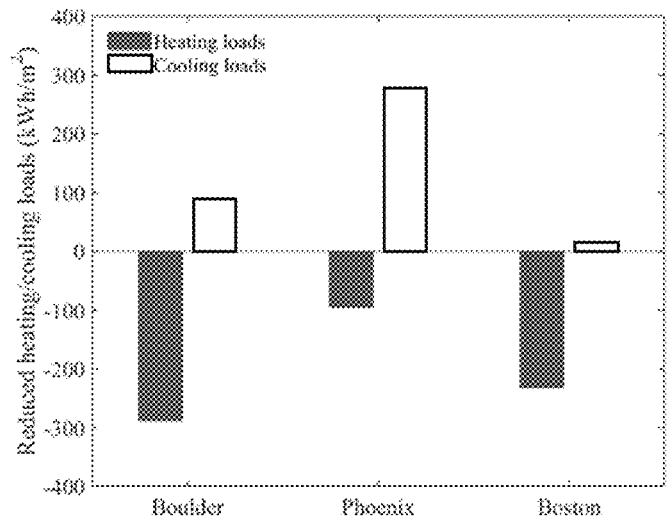

FIGS. 6A-6C illustrate thermal comfort and energy saving of the PMMA-$VO_2$ film of the present disclosure applied to windowpanes in selected cities. Specifically, FIG. 6A depicts a heat and solar radiation transfer pattern through a windowpane. A heat transfer model is developed to evaluate the energy saving performance of a PMMA-$VO_2$ film in different climates and regions. Here, a PMMA-$VO_2$ film with a thickness of about 4 μm is employed. The spectral transmittance of the PMMA-$VO_2$ film in both the insulating phase and the metallic phase was shown in FIG. 3A. Since the thickness of the window is much smaller than its width and length, the heat transfer in the z-direction can be treated as one-dimensional. Thus, the heat transfer in the z-direction can be described as, $$k_{gla}\frac{\partial^2 T(z)}{\partial z^2} + \nabla q(z) = 0 \quad (6)$$

where $k_{gla}$ is the thermal conductivity of the float glass, $T(z)$ is the temperature at position z, $q(z)$ is the local heat source carried by the solar irradiation, which can be written as $$q(z) = \tau_{sol} I_o e^{-\beta_{gla} z} \quad (7)$$

where $I_o$ is the incident solar energy, $\tau_{sol}$ is the solar transmittance of the PMMA-VO2 film, and $\beta_{gla}$ is the extinction coefficient of the float glass. Compared with the thickness of float glass (3 mm), the thickness of the PMMA-VO$_2$ (about 4 μm) film can be ignored. Thus, the boundary conditions at z=0 and z=$L_{gla}$ are as follows:

$$q(z=0) = h_o(T_a - T_{z=0}) + \sigma\varepsilon_o(T_a^4 - T_{z=0}^4) + Q_{abs} \quad (8)$$

$$q(z=L_{gla}) = h_i(T_{z=L_{gla}} - T_r) + \sigma\varepsilon_i(T_{z=L_{gla}}^4 - T_r^4) \quad (9)$$

where $T_a$ and $T_r$ are the external ambient temperature and the internal room temperature, respectively, $h_e$, $h_i$ and $\varepsilon_e$, $\varepsilon_i$ are the external and internal convective heat transfer coefficients and average external and internal surface emissivities, $\sigma = 5.67 \times 10^{-8}$ Wm/K$^4$ is the Stefan-Boltzmann's constant, $Q_{abs} = \alpha_{sol} I_o$, is the absorbed solar irradiation by the PMMA-VO$_2$ film, and $\alpha_{sol}$ is the absorbance of the PMMA-VO$_2$ film. Here, Eq. (6) was solved by the finite volume method. The thermal conductivity and average surface emissivity of the float glass are assumed to be $k_g$=0.96 W/(mK) and $\varepsilon_o \approx 0.84$ according to reference (B. P. Jelle, Solar radiation glazing factors for window panes, glass structures and electrochromic windows in buildings-Measurement and calculation, Solar Energy Materials and Solar Cells, 116 (2013) 291-323). The surface emissivity of the PMMA-VO$_2$ film is $\varepsilon_0 \approx 0.9$. From FIG. 3A, the solar transmittances ($\tau_{sol}$) of the PMMA-VO$_2$ film in the insulating phase and metallic phase are 0.57 are 0.40, respectively. The reflectances ($r_{sol}$) of the PMMA-VO2 in both the insulating and metallic phases were measured as 0.05. Thus, the absorbance can be calculated by $\alpha_{sol} = 1 - \tau_{sol} - r_{sol}$. The inside and external convective heat transfer coefficients can be evaluated by $h_i$=3.6 W/(m$^2$K) and $h_o$=(10+4.1v) W/(m$^2$K), where v (m/s) is the wind speed. The weather conditions including ambient temperature ($T_o$), window speed (v) and solar irradiation density ($I_o$) are acquired from the NSRDB Data Viewer (https://maps.nrel.gov/nsrdb-viewer/).

FIG. 6B is a plot comparing the inside surface temperatures of a single-pane window with and without a PMMA-VO$_2$ film. After employing the PMMA-VO$_2$ film, the inside surface temperature of the single-pane window is approximately 5° C. higher than that of the single-pane window without such a film, indicating that the PMMA-VO$_2$ film can reduce the temperature difference between the occupants and the innermost surface of windows, which indeed improves the thermal comfort and condensation resistance of the single-pane window in cold climates significantly. Since the solar transmittance of the PMMA-VO$_2$ film (0.57~0.4 according to FIG. 3A) is smaller than the single-pane window (approximately 90%), applying the PMMA-VO$_2$ film increase the heating loads in cold climates and reduce the cooling loads in hot climates.

FIG. 6C is a chart comparing reduced annual heating/cooling loads of a south-facing window in different regions. In FIG. 6C, the positive/negative sign represents the reduced/increased energy. For simplicity, it is assumed that the transmitted solar energy decreases (increases) the heating (cooling) loads when the external ambient temperature is higher (lower) than the internal room temperature (21° C.). Note that the transmitted solar energy includes both the directly transmitted solar irradiation and the absorbed solar energy by window pane and subsequently transferred towards the indoor room environment through heat conduction. Clearly, the cooling demands in the hot areas (e.g., Phoenix, Ariz.) are significantly reduced. However, in the cold areas (e.g., Boston, Mass.), the increased heating loads in winter are much higher than the reduced cooling loads in summer, indicating that the PMMA-VO$_2$ film could increase the annual energy cost.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A process for fabricating a thermochromic film comprising the steps of:
   dispersing a predetermined amount of thermochromic nanoparticles in a predetermined amount of a polymer matrix material;
   stirring a mixture thereof for a first predetermined amount of time;
   generating cross-links in molecule chains of the polymer matrix material in the mixture; and
   coating a predetermined thickness of the cross-linked mixture on a substrate to form the thermochromic film.

2. The process of claim 1 further comprising applying ultrasonic energy to the polymer matrix material during the dispersing.

3. The process of claim 1, wherein the thermochromic nanoparticles are crystalline vanadium dioxide (VO$_2$) nanoparticles.

4. The process of claim 3 further comprising synthesizing the vanadium dioxide (VO$_2$) nanoparticles from vanadium pentoxide (V$_2$O$_5$).

5. The process of claim 4, wherein the synthesizing process comprises:
   adding a predetermined amount of vanadium pentoxide (V$_2$O$_5$) powder to a predetermined amount of deionized water;
   stirring a mixture thereof for a second predetermined amount of time;
   adding a predetermined amount of oxalic acid dihydrate to the mixture;
   further stirring the resulting mixture until a clear light green or blue slurry is formed;
   keeping the resulting mixture at a first predetermined elevated temperature for a third predetermined amount of time;
   air-cooling the resulting mixture to room temperature to obtain black-precipitates;
   washing the black-precipitates with deionized water and ethanol sequentially; and
   drying the washed black-precipitates with a vacuum furnace at a second elevated temperature for a fourth predetermined amount of time.

6. The process of claim 5, wherein the second predetermined amount of time is approximately 20 minutes.

7. The process of claim 5, wherein the first elevated temperature is approximately 260° C.

8. The process of claim 5, wherein the third predetermined amount of time is approximately 24 hours.

9. The process of claim 5, wherein the second elevated temperature is approximately 120° C.

10. The process of claim 5, wherein the fourth predetermined amount of time is approximately 5 hours.

11. The process of claim 3, wherein the polymer matrix material is poly(methyl methacrylate) (PMMA) with molecular weight approximately 950,000 forming a matrix.

12. The process of claim 11, wherein a lifetime of the vanadium dioxide ($VO_2$) nanoparticles embedded in the cross-linked PMMA is longer than approximately 900 hours under a temperature of approximately 60° C., and a relative humidity at approximately 95%.

13. The process of claim 1, wherein the first predetermined amount of time is approximately 12 hours.

14. The process of claim 1, wherein the generating cross-links includes irradiating the mixture with a radiation for a fifth predetermined amount of time while stirring the mixture at a predetermined rev per minute (rpm).

15. The process of claim 14, wherein the radiation is a UV radiation with a wavelength shorter than 300 nm.

16. The process of claim 14, wherein the fifth predetermined amount of time is approximately 10 hours.

17. The process of claim 14, wherein the predetermined rev per minute (rpm) is approximately 300.

18. The process of claim 14 further comprising maintaining the irradiated mixture at a substantially constant temperature of approximately 75° C. for approximately 40 minutes.

19. The process of claim 14 further comprising adjusting a dose of the UV radiation to control a cross-link degree in the polymer matrix material.

20. The process of claim 14 further comprising adjusting the fifth predetermined amount of time to control a cross-link degree in the polymer matrix material.

21. The process of claim 1, wherein the coating uses a blade moving relative to the substrate at a predetermined speed while maintaining a predetermined gap to the substrate.

22. The process of claim 21, wherein the predetermined speed is 15 mm/second.

23. The process of claim 1, wherein the substrate is a substantially transparent biaxially-oriented polyethylene terephthalate (BoPET) sheet.

24. The process of claim 1 further comprising drying the coated substrate in a fume hood for approximately 2 hours.

* * * * *